United States Patent
Ray et al.

(10) Patent No.: US 11,023,470 B2
(45) Date of Patent: Jun. 1, 2021

(54) VOICE RESPONSE SYSTEM FOR TEXT PRESENTATION

(71) Applicant: INTERNATIONAL BUSINESS MACHINES CORPORATION, Armonk, NY (US)

(72) Inventors: Shubhadip Ray, Secaucus, NJ (US); Sarbajit K. Rakshit, Kolkata (IN); Craig M. Trim, Ventura, CA (US); Avik Sanyal, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 16/190,296

(22) Filed: Nov. 14, 2018

(65) Prior Publication Data

US 2020/0151273 A1    May 14, 2020

(51) Int. Cl.
| | |
|---|---|
| *G06F 16/00* | (2019.01) |
| *G06F 16/2457* | (2019.01) |
| *G06N 20/00* | (2019.01) |
| *G06F 16/29* | (2019.01) |
| *G06F 16/248* | (2019.01) |
| *G06F 40/30* | (2020.01) |

(52) U.S. Cl.
CPC ...... *G06F 16/24575* (2019.01); *G06F 16/248* (2019.01); *G06F 16/29* (2019.01); *G06F 40/30* (2020.01); *G06N 20/00* (2019.01)

(58) Field of Classification Search
CPC .... G06F 16/24575; G06F 40/30; G06F 16/29; G06F 16/248; G06N 20/00
See application file for complete search history.

(56) References Cited

U.S. PATENT DOCUMENTS

| | | |
|---|---|---|
| 7,277,855 B1 | 10/2007 | Acker |
| 9,711,148 B1 | 7/2017 | Sharifi |
| 10,446,147 B1 * | 10/2019 | Moniz .................. G10L 15/063 |
| 2002/0173962 A1 | 11/2002 | Tang |
| 2005/0256716 A1 | 11/2005 | Bangalore |
| 2006/0074672 A1 | 4/2006 | Allefs |

(Continued)

FOREIGN PATENT DOCUMENTS

| | | |
|---|---|---|
| GB | 2386289 A | 9/2003 |
| WO | 2017078960 A1 | 5/2017 |

OTHER PUBLICATIONS

Chris Morris, Samsung is Betting Big on the Internet of Things. What Does That Mean for You?, CES 2018, Jan. 9, 2018, entire document, http://fortune.com/2018/01/08/samsung-bets-on-iot-what-does-that-mean-for-you/.

(Continued)

*Primary Examiner* — Alexander Khong
(74) *Attorney, Agent, or Firm* — Patrick J. Daugherty; Daugherty & Del Zoppo Co., LPA

(57) ABSTRACT

In response to a user query, aspects identify a content requirement for satisfaction of the user query as a function of context profile data of the user comprising a subject matter requirement, a personal requirement, and a restriction parameter, retrieve a search result that satisfies the content requirement, select a first portion of the search result as a function of a user current context, and the restriction parameter, and present the first selected portion to the user in satisfaction of the first user query.

19 Claims, 5 Drawing Sheets

(56) References Cited

U.S. PATENT DOCUMENTS

| | | | |
|---|---|---|---|
| 2008/0235024 A1 | 9/2008 | Goldberg | |
| 2013/0260352 A1* | 10/2013 | Abraham | G09B 7/02 |
| | | | 434/350 |
| 2015/0120661 A1* | 4/2015 | Keebler | G06F 16/27 |
| | | | 707/627 |
| 2015/0279366 A1 | 10/2015 | Krestnikov | |
| 2017/0053021 A1* | 2/2017 | Hewitt | G06F 16/3344 |
| 2017/0116986 A1 | 4/2017 | Weng | |
| 2017/0177710 A1* | 6/2017 | Burlik | G01C 21/3667 |
| 2017/0221471 A1* | 8/2017 | Sharifi | G06F 40/253 |
| 2017/0270919 A1 | 9/2017 | Parthasarathi | |
| 2017/0293610 A1 | 10/2017 | Tran | |
| 2017/0364516 A1 | 12/2017 | Shellef | |
| 2018/0218046 A1* | 8/2018 | Woo | G06F 16/248 |
| 2019/0198016 A1* | 6/2019 | McKenzie | G10L 15/19 |
| 2020/0050788 A1* | 2/2020 | Feuz | G06F 16/9537 |
| 2020/0125802 A1* | 4/2020 | Wigder | G06F 40/279 |
| 2020/0202194 A1* | 6/2020 | Wu | G06N 3/004 |

OTHER PUBLICATIONS

Mihai Matei, Voice Match Will AllowGoogle, Home to Recognize Your Voice, Android Headlines, Oct. 4, 2017, entire document, https://www.androidheadlines.com/2017/10/voice-match-will-allow-google-home-to-recognize-your-voice.html.

Peter Mell et al, The NIST Definition of Cloud Computing, National Institute of Standards and Technology, Publication 800-145, 2011, entire document.

\* cited by examiner

VOICE RESPONSE SYSTEM FOR TEXT PRESENTATION

BACKGROUND

A text to speech system converts normal language text into speech. A text-to-speech system is composed of two parts: a front-end and a back-end. The front-end has two tasks. First, it converts raw text containing symbols like numbers and abbreviations into the equivalent of written-out words. This process is often called text normalization, pre-processing, or tokenization. The front-end then assigns phonetic transcriptions to each word, and divides and marks the text into prosodic units, like phrases, clauses, and sentences. The process of assigning phonetic transcriptions to words is called text-to-phoneme or grapheme-to-phoneme conversion. Phonetic transcriptions and prosody information together make up the symbolic linguistic representation that is output by the front-end. The back-end—often referred to as the synthesizer—then converts the symbolic linguistic representation into sound. In certain systems, this part includes the computation of the target prosody (pitch contour, phoneme durations), which is often imposed on the output speech.

SUMMARY

In one aspect of the present invention, a computerized method for identifying query responses as a function of user profile data includes executing steps on a computer processor. Thus, in response to a user query, a computer processor is configured identify a content requirement for satisfaction of the user query as a function of context profile data of the user comprising a subject matter requirement, a personal requirement, and a restriction parameter, retrieve a search result that satisfies the content requirement, select a first portion of the search result as a function of a user current context, and the restriction parameter, and present the first selected portion to the user in satisfaction of the first user query.

In another aspect, a system has a hardware processor in circuit communication with a computer readable memory and a computer-readable storage medium having program instructions stored thereon. The processor executes the program instructions stored on the computer-readable storage medium via the computer readable memory and in response to a user query is thereby configured to identify a content requirement for satisfaction of the user query as a function of context profile data of the user comprising a subject matter requirement, a personal requirement, and a restriction parameter, retrieve a search result that satisfies the content requirement, select a first portion of the search result as a function of a user current context, and the restriction parameter, and present the first selected portion to the user in satisfaction of the first user query In another aspect, a computer program product for identifying query responses as a function of user profile data includes executing steps on a computer processor that has a computer-readable storage medium with computer readable program code embodied therewith. The computer readable hardware medium is not a transitory signal per se. The computer readable program code includes instructions for execution which in response to a user query cause the processor to identify a content requirement for satisfaction of the user query as a function of context profile data of the user comprising a subject matter requirement, a personal requirement, and a restriction parameter, retrieve a search result that satisfies the content requirement, select a first portion of the search result as a function of a user current context, and the restriction parameter, and present the first selected portion to the user in satisfaction of the first user query

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
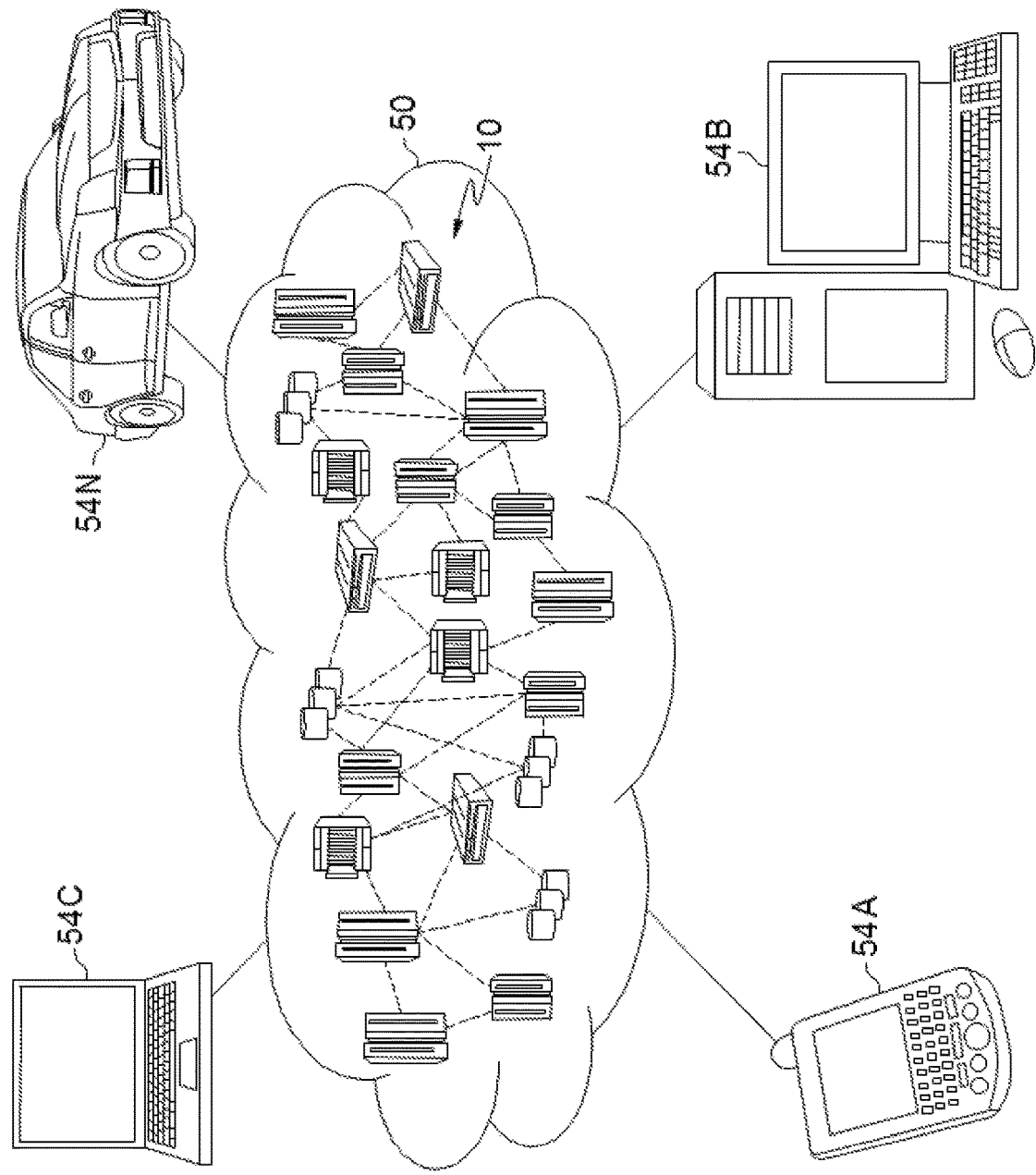
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, mechanically encoded devices such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
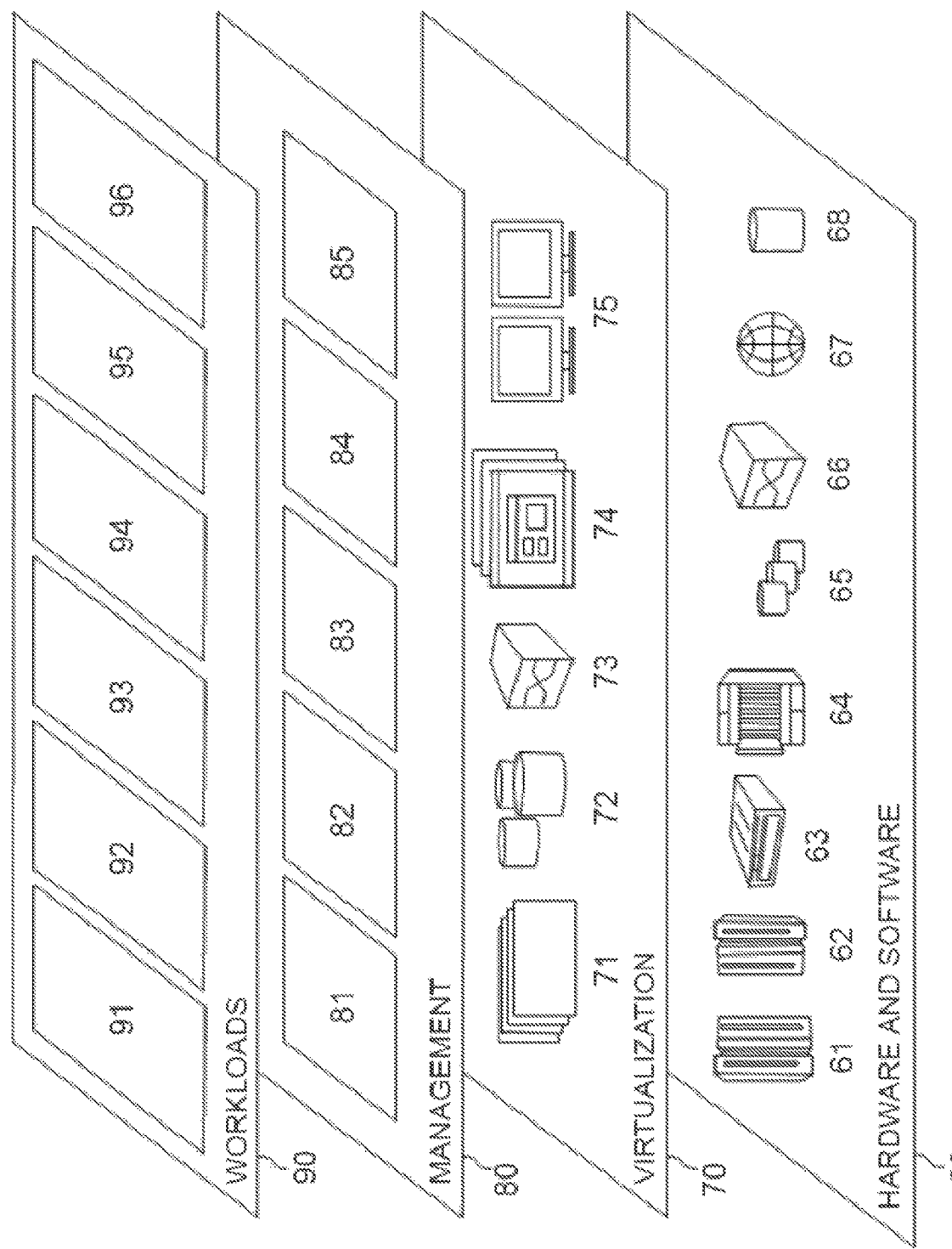
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for identifying query responses as a function of user profile data 96.

Figure 3:
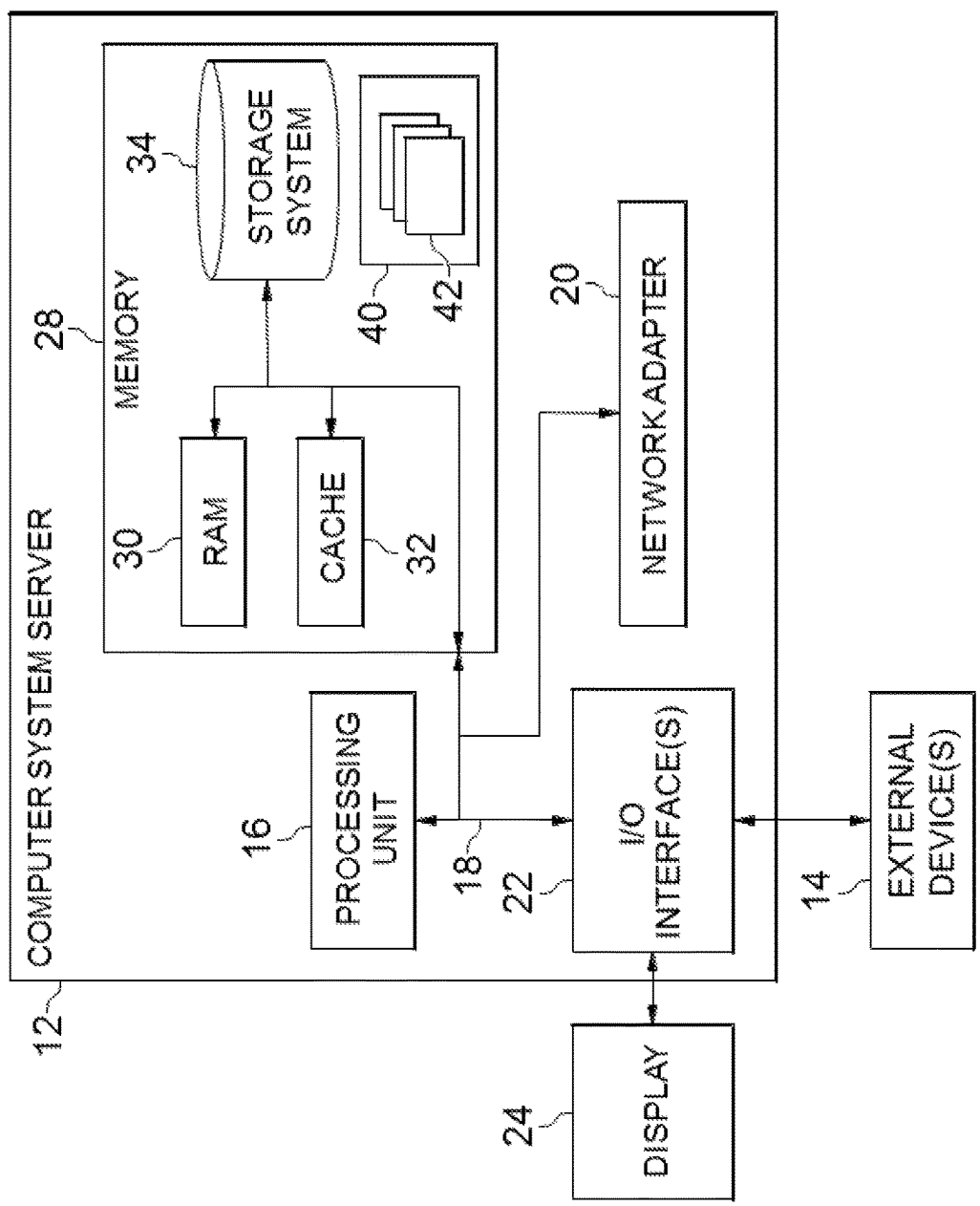
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
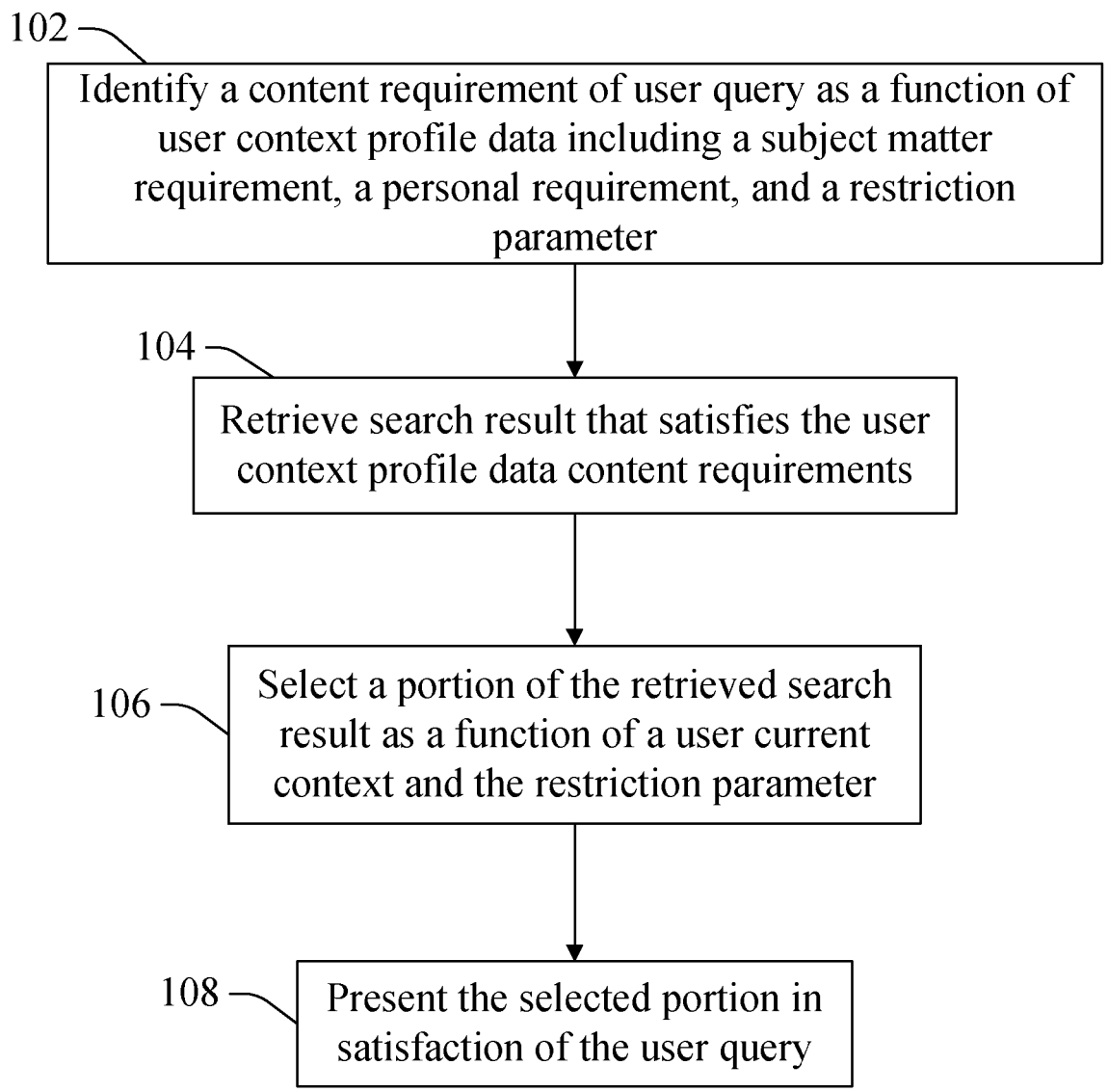
FIG. 4 is a flow chart illustration of an embodiment of the present invention.

FIG. 4 illustrates a process or system according to the present invention for identifying query responses as a function of user profile data. In response to a user query for an information item, at 102 a processor that is configured according to an aspect of the present invention (the "configured processor") identifies a content requirement for satisfaction of the user query as a function context profile data of the user. The context profile data is inclusive of a subject matter requirement, a personal requirement, and a restriction parameter.

At 104, the configured processor retrieves a search result that satisfies the content requirement and thereby satisfies the user query.

At 106, the configured processor selects a portion of the search result as a function of a user current context and the restriction parameter.

At 108, the configured processor presents the selected portion to the user in satisfaction of the user query and the user context profile data.

The embodiment of FIG. 4 provides for a personalized and interactive, Artificial Intelligence (AI) based voice response system wherein text-to-speech translation processes provide responses to users in satisfaction of a user query by gleaning content out of documents and other search results that satisfy the query as a function of user context profile data inclusive of personal parameters unique to the use and a user current context.

Aspects of the present invention learn and adjust and personalize results provided to the user based on user-specific qualitative and quantitative thresholds that are indicated within, or determined or derived from, the user profile data or the user query. Aspects thereby determine levels of detail needed in satisfaction of the query as function of information or attributes defining the query from text-to-speech processing and translation of a verbal query from the user, based on the user context profile data (user parameters, current context, biometric data, etc.).

By considering historical user interaction behavior with textual and other content returned in response to previous queries, aspects of the present invention identify and learn the most relevant or likely qualitative and quantitative parameters that define satisfactory response content based on the user perspective (as defined by the user context profile data). Aspects thereby create and present satisfactory responses to the user that are based on historical learning and search, recognizing qualitative and quantitative questions, standards or limitations within voice-based inputs from the user.

In one example, a user query for an information item includes "read me the first sports page." At 102, in response to the user query, the configured processor identifies a content requirement as a function context profile data of the user. The context profile data includes a subject matter requirement, a personal requirement, a restriction parameter, a context of the user, and biometric data. The configured processor identifies the subject matter requirement as including sports content as the query is directed to "a sports page." The configured processor further identifies the personal requirement. This may include identifying a most relevant sporting news provider within the user context profile data. For example, the user context profile data may include a newspaper publisher that the user most frequently reads on-line or subscribes to. The configured processor further identifies the restriction parameter as a "first page" as the as the query includes a first page.

At 104, the configured processor retrieves a search result ("content") that satisfies the content requirement. In this example, a first sports page of a most relevant sporting news provider within the geographic location of the user as identified by the user context profile data.

At 106, the configured processor selects a portion of the retrieved content as a function of the restriction requirement and a user current context. In this example, the configured processor identifies the restriction parameter as a single page content as identified by the user query. The configured processor further selects the portion of the retrieved content as a function of the user current context. The user current context may be determined as a function of user biometric data. The configured processor further identifies biometric data of the user. For example, the configured processor may determine the user is calm (via biometric data analysis) and not busy. The configured processor may determine the user is not busy as function of the user performing another task (i.e., actively editing a document). Since the biometric data indicates the user is not busy and is calm, the configured processor selects an entire current cover or first page of the sports news section. Biometric data indicating the user is calm may include voice analysis data that shows the user is talking at a predetermined volume (i.e., 60 decibels), or at a predetermined speech speed (i.e., 145-160 words per minute). Biometric data indicating the user is agitated may include voice analysis data that shows the user is talking at an elevated volume (i.e., >60 decibels), or at an elevated speech speed (i.e., >160 words per minute).

At 108, the configured processor presents the selected portion to the user. This may include generating and presenting an audio presentation of the text of the selected portion of the retrieved content ("narrating") the selected sports page to the user thereby satisfying the user query.

In one example, a user query may include "read my last text message." In response to this query, the configured processor identifies the last received work-related text message as satisfying the content requirement (at 102), wherein the restriction requirement of the user profile data indicates that only work related messages (from co-workers within the same organization, clients, or having a work-related subject content) should be presented to the user in response to this voice command if the user's current context includes a work activity context (the configured processor may determine the user is conducting a work activity context as a function of determining the user's geographic location is at work or as a function of the user is editing a work related document); retrieves the last received text message meeting the restriction above (at 104), selects the entirety of the last received text message as the selected portion that satisfies the restriction requirement indicated by the first voice command (at 106), and as a function of determining that the user is calm (via biometric data analysis) and is not busy in performing another work-related task (for example, actively editing a spreadsheet, etc.); and (at 108) responsively narrates the entire last received text message (at 108).

In another example, in response to determining that the user query includes "read my last text message" the configured processor determines the user current context to a personal or work activity context value (for example, the user is in a personal or a work activity context as a function of determining the user's geographic location is at home, or as a function of determining that the user is editing a document that comprises personal or work-related content), and the restriction requirement indicates that only personal messages should be presented to the user if the determined user current context is the personal activity context, then the configured processor selects a non-work related text message (from friends, family, etc.) from a plurality of messages that otherwise satisfy the user query.

In another example, the configured processor determines that a user is at work (i.e., a same geographic location every weekday from 9 A.M.-5 P.M.) and stores the "work" geographic location as context profile data. While at this location, if the user says, "read me my last text message," the restriction requirement of the user profile data indicates that only work appropriate language should be presented while the user at work and the text message contains language that is not appropriate for work, wherein the configured processor selects text that is appropriate for work (at 106, FIG. 4) and thereby satisfies the content requirement; or the configured processor prevent presentment of the text message where the applicable content requirement requires that the presentation includes only work appropriate language while at the "work" geographic location.

In another example, a query may include "summarize the president's wiki page" and the restriction parameter of the context profile data may include a historical restriction. The historical restriction may be determined as a function of previous commands which are stored as context profile data of the user. For example, if the configured processor has previously received commands regarding age, education, and previous employment of a person then the configured processor selects sections of a query result document or web page that correspond to age, education, and previous employment as the selected portion that satisfies the historical restriction as indicated by the user context profile data.

In another example, when the user has a document open and the document contains a hyperlink, and the user query includes a command to present information about the hyperlink (i.e., "what is this link about?") then the configured processor (at 106) selects descriptive metadata embedded in the hyperlink as the selected portion, retrieves description information from a source that the user profile data indicates is preferred or trusted by the user (a wiki page, a favorite blog, a review or news item published by a news service that the user subscribes to, etc.), and generates a result for presentation to the user in compliance with the current context and biometric state of the user.

In another example, the personal requirement, subject matter requirement, or the restriction parameter may include meeting a qualitative or quantitative threshold. In one example, a user query may include "read me my latest email if answers are clearly provided." In this example, the configured processor determines the questions the user wants the answers to as a content requirement, and searches and retrieves previous communications (for example, emails in an associated thread) to determine questions to be satisfied in presented search results. The configured processor then identifies accurate answers to the question by determining if text content of an answer is related to a term of the user query.

For example, if the question is how many items were in the last purchase order and answer is a definitive statement with an attached value (i.e., "there were 6,000 units" in the last purchase order) then the answer is determined as accurate as an exact value within the answer is related to the term "clearly" identified within the query.

If the same question is asked and the answer is inconclusive or imprecise (for example, "there were about 4,000-5,000 units in the last purchase order," no answer is provided, or the answer is nonsensical, such as a lunch order is the determined answer in response to the question about a purchase order of widgets, etc.) then the configured processor does not determine the answer is accurate as these responses are not related to the term "clearly." The configured processor then selects only those other search results or information data items that are accurate for use in generating a response to the query.

In another example, a user query may include "read my last email and tell me how many units were shipped." In this example, the configured processor determines the restriction parameter requires the answer to the query includes a value that is determined from a specific (last in time email) document. The configured processor thus searches for and retrieves the users last email as the search result and analyzes the text of the last email to identify text content that includes a value (number) of units shipped and selects the value of the units as the selected portion for presentment to the user.

In another example, a user query may include "ready me a work email if three questions are answered." In this example (at 102), the configured processor determines restriction parameter includes a threshold number of answers (the answers to three questions) must be included in the search result. The configured processor searches and analyzes the text of previous communications that have work-related content (subject matter, sender or recipient identification or associated organization or entity, etc.) to determine the presence of a number questions that satisfy the user query (i.e., three) within each of a plurality of work-related emails within an email service in-box, including optionally in response to a parameter of this user that indicates that only work-related emails should be returned in response to a query, unless the user specifies otherwise (for example, "read me my last personal email that . . . "). The configured processor then determines if a number of answered questions meets the threshold for each work-related email. In this example, if there are three or more questions answered, then the configured processor selects a portion of work-related email that includes three answers to the three questions for presentation to the user at (at 108).

The query result personal requirement, the subject matter requirement, or the restriction parameter may further include a quality threshold. The quality threshold may be applied in searching or presenting information to the user, embodiments determine a quality threshold as a function of a historical restriction of the context profile data.

For example, a user query may include "present the latest article on approval sports team ranking only if my quality standard is met." The configured processor determines the user's the query includes a quality threshold as the user has indicated. Furthermore, the configured processor determines the quality threshold by comparing a specific search result or answer to the user query within the search result to previous responses to previous user queries. For example, while narrating a previous opinion article on the sports team ranking, the user said that the article lacks substantive data regarding the sports team ranking and therefore lacks quality. This data is stored as a historical restriction within the user context profile data. As a result, the configured processor determines that the user's quality standard regarding sports team ranking includes substantive data. Hence, in response to the query to present the latest article on the sports team ranking only if the quality standard is met, the configured processor will only present the article if the article includes substantive data (i.e., polling numbers from a preferred or acceptable polling organization), thus meeting the user's quality threshold, thereby satisfying the content requirement as a function of context profile data.

In another example, while narrating a response to a user query written by certain publication or by a certain author, the user may have indicated that the article was a quality article or not a quality article because of who published or authored the text. The embodiment identifies and stores this determined indication as a historical restriction condition. For instance, the user may have had an audible positive or negative reaction to the response to the user query. If the latest article from a search on the president's approval rating is written by one of the publishers or authors that the user has previously indicated is not a quality publication or author, then the configured processor (during a search at 104) skips the article until the configured processor finds an article that is not published or written by a publication or author that the user has not previously indicated is of lesser quality.

A user need not definitively or expressly indicate that the publication or author does not meet the user's quality standard, but embodiment may infer such a standard. For instance, in response to determining that the user stops narration every time the configured processor presents text written by a certain author or published by a certain publication, the embodiment stores this determination (observation) as an inferred or implicit historical restriction, determining that the author or publication does not meet the user's quality standard as a function of the user's ceasing narration of the document.

User current context requirements or attributes may be determined as a function of a level of user engagement. Thus, embodiments may summarize text content in generating portion presentations in response to determining that the user has a low level of engagement; for example, in response to determining that the user is driving or operating equipment. including as a function of identifying a connection to an automobile Bluetooth device, or as a function of a rapidly changing geographic location (for example, a geographic location that changes at a speed greater than 20 miles per hour). While in the car, the user may say "read me my last email." In this example, in response to determining that the user has low level of engagement, the configured processor selects a portion of the email (at 106) that satisfies the current context and thereby summarizes the email. The summary may be restricted by a threshold word count or a threshold time needed to dictate the summary.

In contrast, embodiments may select entireties of, or larger or more complex text content selections, in response to determining that the user has a high level of engagement. For example, in response to determining that the user is at work, a configured processor may determine the user has a high level of engagement as a default setting with respect to work-related result content. Thus, if the query includes "read my latest email," and the configured processor determines that the user is at work and the current context requirement specifies that an entirety of a text having work-related content be presented while the user is at work, then the configured processor selects and presents an entirety of text content of a work-related email within a plurality of emails returned within a search result at 106.

Embodiment may further determine levels of user engagement (attention capacity) as a function of user biometric data. For example, if the configured processor determines the user is agitated as a function of the user's biometric data, then the configured processor determines the level of user engagement as low. If the configured processor determines the user is calm as a function of the user's biometric data, then the configured processor determines the level of user engagement as high.

Figure 5:
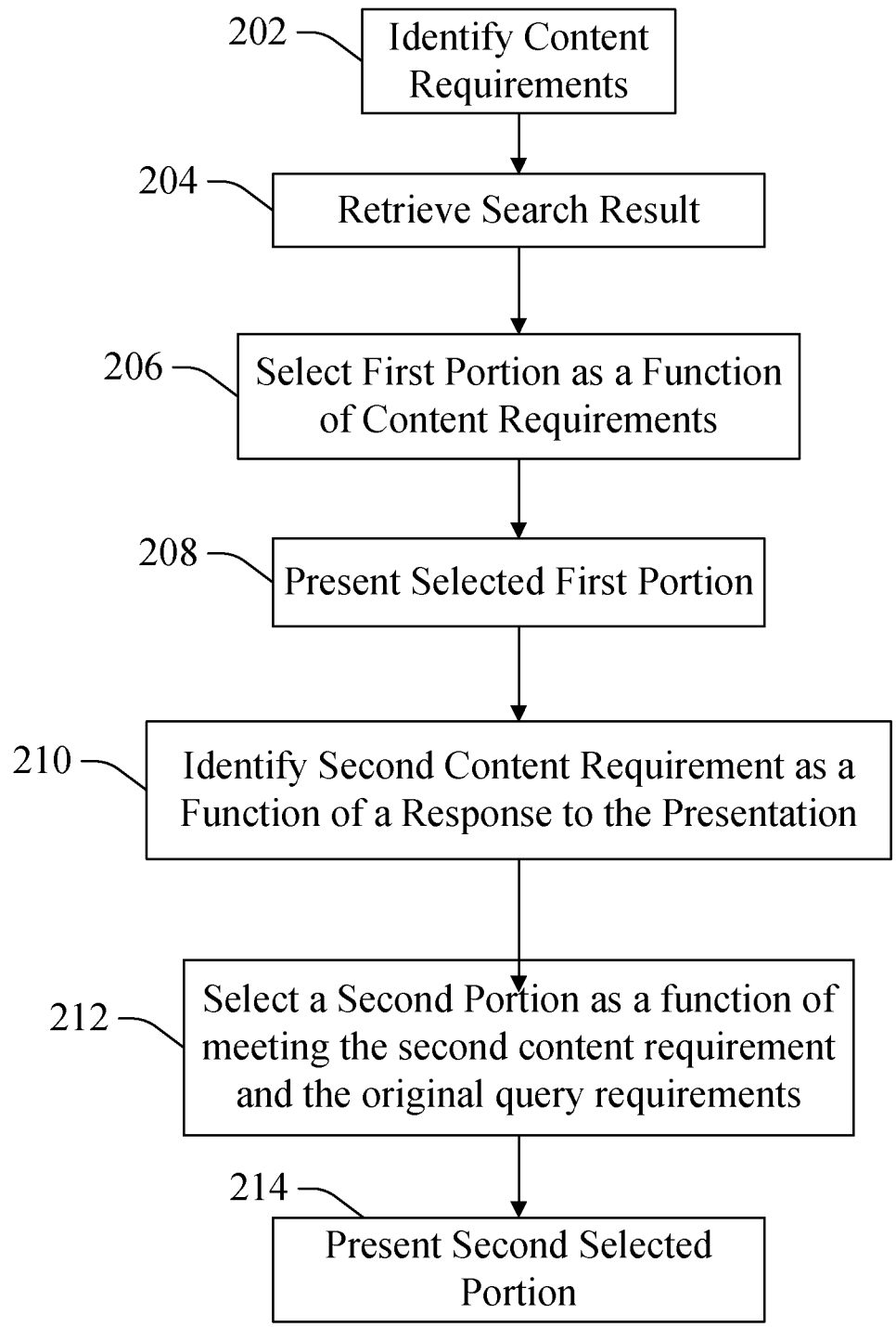
FIG. 5 is another flow chart illustration of an embodiment of the present invention.

FIG. 5 illustrates another process or system according to the present invention for identifying query responses as a function of user profile data.

At 202, the configured identifies a content requirements for satisfaction of a user query as a function of context profile data of the user as described herein.

At 204, the configured processor retrieves a search result that satisfies the content requirements as described herein.

At 206, the configured processor selects a first portion of the search result that satisfies the user query content requirements as described herein.

At 208, the configured processor presents the selected first portion as described herein.

At 210, the configured processor identifies an additional, "second" content requirement for satisfaction as a function of user context profile data and as a function of a user response to the presented first selected portion.

At 212, the configured processor selects a second portion of the search result that includes an item that was not within the first selection portion as function of meeting the second content requirement and the original query requirements.

At 214, the configured processor presents the selected second portion to the user in satisfaction of the second user query as described herein In one example, the first user query may include "present the food items on my grocery list." While narrating the food items (at 208), the user may say "next." The configured processor then stops narrating the grocery list and presents the next item in the list (at 214) as the selected second portion that satisfies the second content requirement.

In another instance, the second user query may be an audible indication that the user is not satisfied with the presentation of first selected portion. For example, while the configured processor is narrating a selected portion about a sporting event the user may say "this is bad," the configured processor identifies this as a response to the presentation. The configured processor may then select a second portion of the search result that includes an item that was not in the first presentation.

In another example, the response to the presentation may include a user request for additional information. For instance, while narrating the first text regarding a sporting event (at 208), the user may ask "what was the final score?" The configured processor identifies this as a response to the presentation and further identifies the second content requirement as including a score to the sporting event in the text being presented. The configured processor then searches for and selects content that includes the score within the search result as the second portion of the search result (at 212). The configured processor presents the selected second portion to the user in satisfaction of the second user query (at 214). The configured processor may then return to resenting the second portion.

Aspects described herein can present entireties or appropriate selections of text content within query results with machine generated speech. As a result, a user does not have to read the content of the text. With voice response systems, a user can submit voice command to control or execute various computer related activities. For example, a user may want to interact with the computing system during text to speech translation. So, accordingly based on user's command the text to speech translation will be started. In other cases, a user might want to listen to a specific topic or content from a written text. Aspects described herein allow a user to perform a conversation with an AI based voice response system. As a result, text to speech translation is personalized for the user.

Embodiments enable cognitive text-to-speech translation in a variety of personal devices, wherein during the presentation of text information to a user the device is enabled to observe user behavior and dynamically revise the presentation. For example, embodiments may stop a translation and move on to another processing task in response to observing changes in user biometric data or presentation context (for example, leaving or entering a work space, driving or parking a vehicle, etc.)

A user device gathers user input to determine if the user is satisfied with the text content. For example, the system may identify that user is not satisfied with the presented content or determine that additional content is required. Accordingly, the system calculates and applies a second content requirement rule for quality checking the content based on user's historical data and current context to generate further refined (second) result portion presentments.

Historical user feedback about any presentation may be analyzed to identify qualitative and quantitative parameters of the content based on user's perspective and context. Based on this analysis, an embodiment may identify what content should be added to the presentation to meet the qualitative and quantitative threshold. Embodiments further analyze the user query and perform searches within a document result to find a relevant section as a function of the query, and may also validate the result as a function of a quality of the selection and level of detail of the selection required pursuant to user's historical data and current context.

In response to selection of a portion of the document, embodiments may communicate text content with a text to speech translation engine, to thereby narrate the text. User biometric data may be analyzed to identify the level of detail the user wants presented, wherein embodiments may communicate with a text to speech translation to summarize the content based on a current context. When user submits a query to the system, embodiments gather surrounding content (i.e., user current context) and historical information of the user to determine actual needs of the user to be satisfied by portion selections from a document result.

Embodiments consider feedback from users to presented query portions in generating new, revised portion selections, and thereby learn additionally conditions for subsequent portion selections that improve the satisfaction of the user with the query results relative to the perceived quality of search results provided by prior art systems and methods.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying query responses as a function of user profile data, comprising executing on a computer processor:
   in response to a user query, identifying a content requirement for satisfaction of the user query as a function of context profile data of the user comprising a subject matter requirement, a personal requirement, and a restriction parameter;
   determining a high level of user engagement in response to determining the user is calm as a function of user biometric data that indicates that the user is speaking below a threshold volume;
   determining a low level of user engagement in response to determining that the user is agitated as a function of user biometric data that indicates that the user is speaking at an elevated volume above the threshold volume;
   retrieving a search result that satisfies the content requirement;
   selecting an entirety of the search result as a first portion of the search result as a function of a user current context, and the restriction parameter, in response to determining the high level of user engagement;
   selecting a subset portion of the search result that is less than the entirety of the search result as the first portion as a function of the user current context, and the restriction parameter, in response to determining the low level of user engagement; and
   presenting the first selected portion to the user in satisfaction of the first user query.

2. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and in response to the user query thereby performs the identifying of the content requirement for satisfaction of the user query, the determining the high level of user engagement, the determining the low level of user engagement, the retrieving of the search result that satisfies the content requirement, the selecting of the first portion of the search result as the entirety of the search result, the selecting of the first portion of the search result as the subset portion of the search result, and the presenting of the first selected portion.

3. The method of claim 1, wherein the computer-readable program code is provided as a service in a cloud environment.

4. The method of claim 1, wherein the context profile data restriction parameter requires that each item of the search result contain a threshold number of answers, further comprising:
   processing text content of each of a plurality of items of the search result for answers to the user query; and
   selecting the first portion to comprise items of the search result that each comprise a number of a plurality of answers that meet the restriction parameter threshold number of answers.

5. The method of claim 1, wherein the context profile data restriction parameter requires that the first search result portion contain an answer to the user query that is accurate in meeting a term of the user query and further comprising:
   analyzing text content of each of a plurality of items of the search result to identify answer content that is related to the term of the query;
   determining accuracy of answers identified within the analyzed text content of each of the plurality of items of the search result to identify answer content as related to the term of the query by comparing the identified answers to the user query term; and
   selecting a subset of the items that have answer content identified as related to the term of the query that best match the user query term as the first portion of the first search result.

6. The method of claim 1, further comprising:
   wherein the context profile data restriction parameter requires that each item of the search result contain a specific answer value;
   analyzing text content of each of a plurality of items of the search result to identify answer content; and
   selecting a subset of the items as the first portion of the search result that have answer content containing the specific answer value.

7. The method of claim 1, wherein the user current context for selecting the first portion of the search result is selected from a work activity context and a personal activity context, and the restriction parameter requires that content of the search result match the user current context, further comprising:
    determining that a current geographic location of the user is within a geographic boundary that is associated to one of the work activity context and a personal activity context; and
    selecting a subset of the items as the first portion of the search result that have content identified as matching to the one of the work activity context and a personal activity that is associated to the current geographic location.

8. The method of claim 1 further comprising:
    identifying a second content requirement for satisfaction of the user query as a function of a user response to the presenting the first selected portion;
    selecting a second portion of the search result that satisfies the second content requirement and the user context profile data, wherein the second portion comprises an item that is not within the first portion; and
    presenting the selected second portion to the user in satisfaction of the user query.

9. The method of claim 1, further comprising:
    selecting a subset of the items that have content identified as matching to the restriction parameter as a function of determining that a creator of the subset of the items is within a same organization as the user.

10. The method of claim 1, wherein the selecting the subset portion of the search result that is less than the entirety of the search result as the first portion in response to determining the low level of user engagement comprises:
    selecting a plurality of the search result items that have an aggregate total word count that does not exceed a threshold word count of the restriction parameter; or
    selecting a plurality of the search result items that have an aggregate text content that does not exceed a threshold time of the restriction parameter that is required to generate a text-to-speech narration of the aggregate text content in presentation of the first portion to the user.

11. A system comprising:
    a processor;
    a computer readable memory in circuit communication with the processor; and
    a computer readable storage medium in circuit communication with the processor;
    wherein the processor executes program instructions stored on the computer-readable storage medium via the computer readable memory and thereby:
    in response to a user query, identifies a content requirement for satisfaction of the user query as a function of context profile data of the user comprising a subject matter requirement, a personal requirement, and a restriction parameter;
    determines a high level of user engagement in response to determining the user is calm as a function of user biometric data that indicates that the user is speaking below a threshold volume;
    determines a low level of user engagement in response to determining that the user is agitated as a function of user biometric data that indicates that the user is speaking at an elevated volume above the threshold volume;
    retrieves a search result that satisfies the content requirement;
    selects an entirety of the search result as a first portion of the search result as a function of a user current context, and the restriction parameter, in response to determining the high level of user engagement;
    selects a subset portion of the search result that is less than the entirety of the search result as the first portion as a function of the user current context, and the restriction parameter, in response to determining the low level of user engagement; and
    presents the first selected portion to the user in satisfaction of the first user query.

12. The system of claim 11, wherein the context profile data restriction parameter requires that each item of the search result contain a threshold number of answers and wherein the processor executes the program instructions stored on the computer-readable storage medium via the computer readable memory and thereby:
    processes text content of each of a plurality of items of the search result for answers to the user query; and
    selects the first portion to comprise items of the search result that each comprise a number of a plurality of answers that meet the restriction parameter threshold number of answers.

13. The system of claim 11, wherein the context profile data restriction parameter requires that the first search result portion contain an answer to the user query that is accurate in meeting a term of the user query and wherein the processor executes the program instructions stored on the computer-readable storage medium via the computer readable memory and thereby:
    analyzes text content of each of a plurality of items of the search result to identify answer content that is related to the term of the query;
    determines accuracy of answers identified within the analyzed text content of each of the plurality of items of the search result to identify answer content as related to the term of the query by comparing the identified answers to the user query term; and
    selects a subset of the items that have answer content identified as related to the term of the query that best match the user query term as the first portion of the first search result.

14. The system of claim 11, wherein the context profile data restriction parameter requires that each item of the search result contain a specific answer value and wherein the processor executes the program instructions stored on the computer-readable storage medium via the computer readable memory and thereby:
    analyzes text content of each of a plurality of items of the search result to identify answer content; and
    selects a subset of the items as the first portion of the search result that have answer content containing the specific answer value.

15. The system of claim 11, wherein the user current context for selecting the first portion of the search result is selected from a work activity context and a personal activity context, and the restriction parameter requires that content of the search result match the user current context and wherein the processor executes the program instructions stored on the computer-readable storage medium via the computer readable memory and thereby:
    determines that a current geographic location of the user is within a geographic boundary that is associated to one of the work activity context and a personal activity context; and
    selects a subset of the items as the first portion of the search result that have content identified as matching to the one of the work activity context and a personal activity that is associated to the current geographic location.

16. A computer program product for identifying query responses as a function of user profile data, the computer program product comprising:
a computer readable storage medium having computer readable program code embodied therewith, wherein the computer readable storage medium is not a transitory signal per se, the computer readable program code comprising instructions for execution by a processor that in response to a user query cause the processor to:
identify a content requirement for satisfaction of the user query as a function of context profile data of the user comprising a subject matter requirement, a personal requirement, and a restriction parameter;
determine a high level of user engagement in response to determining the user is calm as a function of user biometric data that indicates that the user is speaking below a threshold volume;
determine a low level of user engagement in response to determining that the user is agitated as a function of user biometric data that indicates that the user is speaking at an elevated volume above the threshold volume;
retrieve a search result that satisfies the content requirement;
select an entirety of the search result as a first portion of the search result as a function of a user current context, and the restriction parameter, in response to determining the high level of user engagement;
select a subset portion of the search result that is less than the entirety of the search result as the first portion as a function of the user current context, and the restriction parameter, in response to determining the low level of user engagement; and
present the first selected portion to the user in satisfaction of the first user query.

17. The computer program product of claim 16, wherein the context profile data restriction parameter requires that each item of the search result contain a threshold number of answers and wherein the computer readable program code instructions for execution by the processor further cause the processor to:
process text content of each of a plurality of items of the search result for answers to the user query; and
select the first portion to comprise items of the search result that each comprise a number of a plurality of answers that meet the restriction parameter threshold number of answers.

18. The computer program product of claim 16, wherein the context profile data restriction parameter requires that the first search result portion contain an answer to the user query that is accurate in meeting a term of the user query and wherein the computer readable program code instructions for execution by the processor further cause the processor to:
analyze text content of each of a plurality of items of the search result to identify answer content that is related to the term of the query;
determine accuracy of answers identified within the analyzed text content of each of the plurality of items of the search result to identify answer content as related to the term of the query by comparing the identified answers to the user query term; and
select a subset of the items that have answer content identified as related to the term of the query that best match the user query term as the first portion of the first search result.

19. The computer program product of claim 16, wherein the context profile data restriction parameter requires that each item of the search result contain a specific answer value, and wherein the computer readable program code instructions for execution by the processor further cause the processor to:
analyze text content of each of a plurality of items of the search result to identify answer content; and
select a subset of the items as the first portion of the search result that have answer content containing the specific answer value.

* * * * *